United States Patent
Balk et al.

(10) Patent No.: US 8,588,454 B2
(45) Date of Patent: Nov. 19, 2013

(54) MODULE FOR CONTAINING AN EARPIECE FOR AN AUDIO DEVICE

(75) Inventors: Cody Allen Balk, Chicago, IL (US); David Kazmierz Szczypinski, Chicago, IL (US); Benjamin Michael Finney, Itasca, IL (US)

(73) Assignee: BlackBerry Limited, Waterloo (CA)

( * ) Notice: Subject to any disclaimer, the term of this patent is extended or adjusted under 35 U.S.C. 154(b) by 207 days.

(21) Appl. No.: 13/023,865

(22) Filed: Feb. 9, 2011

(65) Prior Publication Data
US 2012/0201413 A1 Aug. 9, 2012

(51) Int. Cl.
*H04R 25/00* (2006.01)

(52) U.S. Cl.
USPC ............ 381/380; 381/370; 381/379; 381/386

(58) Field of Classification Search
USPC ......... 381/303–306, 332–334, 152, 361, 365, 381/370–374, 379–381, 386–388
See application file for complete search history.

(56) References Cited

U.S. PATENT DOCUMENTS

| | | | |
|---|---|---|---|
| 2,907,836 A | 10/1959 | Henrikson et al. | |
| 7,340,284 B2 | 3/2008 | Chung | |
| 7,801,570 B2 | 9/2010 | Cheung et al. | |
| 2002/0127974 A1 | 9/2002 | Song | |
| 2004/0077387 A1 | 4/2004 | Sayag et al. | |
| 2007/0071259 A1* | 3/2007 | Tojo | 381/152 |
| 2008/0279409 A1 | 11/2008 | Hupkes | |
| 2009/0124202 A1 | 5/2009 | Seshadri et al. | |
| 2009/0196442 A1 | 8/2009 | Eaton | |
| 2012/0099745 A1* | 4/2012 | Chen | 381/388 |

FOREIGN PATENT DOCUMENTS

| | | |
|---|---|---|
| EP | 1263194 | 12/2002 |
| WO | WO2004/093488 | 10/2004 |
| WO | WO2009/097012 | 8/2009 |

OTHER PUBLICATIONS http://www.parts4ipods.com/epages/es115, website, viewed Jun. 21, 2010.
Mobile-review.com All Nokia 5800 come with a defect?!, website article, viewed Jun. 21, 2010.
Extended European Search Report on corresponding European Patent Application No. 11153803.9; mailed Jul. 5, 2011; 7 pages.

* cited by examiner

*Primary Examiner* — Suhan Ni
(74) *Attorney, Agent, or Firm* — Novak Druce Connolly Bove + Quigg LLP

(57) ABSTRACT

A module for containing an earpiece for an audio device, the earpiece having at least one protruding electrical contact. The module comprises a first portion and a second portion, the first portion and the second portion being opposable and forming a cavity sized to accommodate an earpiece. The module further comprises at least one electrical contact within the cavity, on one of the first portion and the second portion. The electrical contact is positioned to engage a protruding electrical contact of the earpiece positioned within the cavity.

14 Claims, 11 Drawing Sheets

MODULE FOR CONTAINING AN EARPIECE FOR AN AUDIO DEVICE

TECHNICAL FIELD

The present disclosure relates to modules for containing earpieces when installed in an audio device, such as a mobile device.

BACKGROUND

Ear speakers used in audio devices such as mobile telephones and headphones, also known as earpieces, often utilize a protruding, spring-like contact to both create an electrical connection between the earpiece and an audio signal source and to physically hold the earpiece in place within a housing of the audio device. In many instances, the spring force exerted by this contact is borne by the housing of the audio device itself, resulting in physical stress and strain on the housing.

In many audio devices, the stress and strain exerted on the housing by the spring-like contact causes deformation of the housing that is visible from the outside of the audio device. In some instances, the stress and strain exerted by the spring-like contact can cause physical damage and breakage of the housing.

BRIEF DESCRIPTION OF THE DRAWINGS

Reference will now be made to the drawings, which show by way of example, embodiments of the present disclosure, and in which.

In the drawings, like reference numerals denote like elements or features.

DETAILED DESCRIPTION OF THE EMBODIMENTS

Figure 1:
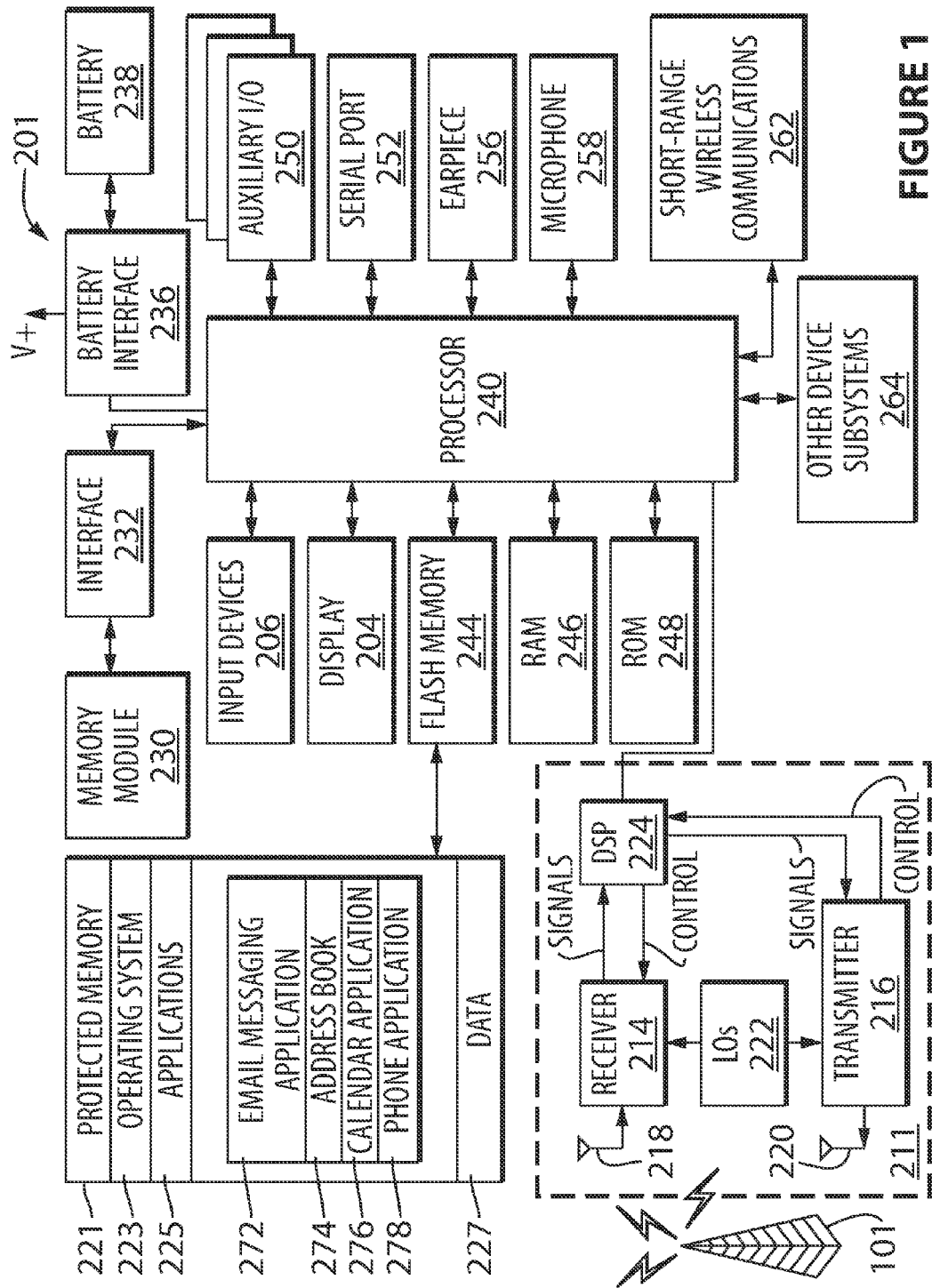
FIG. 1 is a block diagram illustrating a mobile electronic device with which an earpiece module can be used.

Reference is now made to FIG. 1 which illustrates an exemplary embodiment of a mobile electronic device 201, one example of an audio device with which an earpiece module or a module for containing an earpiece can be used. The mobile electronic device 201 is a two-way communication device having data and voice communication capabilities, and the capability to communicate with other computer systems, for example, via the Internet. Depending on the functionality provided by the mobile electronic device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile electronic device 201 includes a rigid case 950 (see FIG. 9A) housing the components of the device 201. The internal components of the device 201 are constructed on a printed circuit board (PCB). The mobile electronic device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, an earpiece 256 for providing audio to the user, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations of the wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

Figure 2:
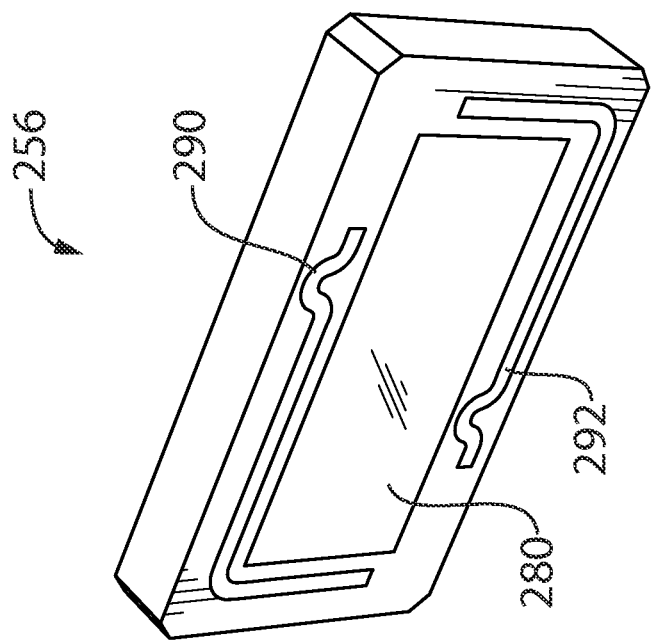
FIG. 2 is a perspective view of an example earpiece for an audio device.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276 and a phone application 278 for non-limiting example.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application. Where the mobile device 201 embodies an administrator computing device 300, a guest computing device 400 or both, an application such as a verified application containing instructions 390, 490 respectively associated with the administrator computing device 300 and the guest computing device 400 may also be included in the software applications 225, the software modules 221 or in other memory locations on the mobile device 201 or in any combination thereof.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the earpiece 256 and signals for transmission are generated by a transducer such as the microphone 258. The telephony functions are provided by a combination of software/firmware (i.e., the phone application 278) and hardware (i.e., the microphone 258, the earpiece 256 and input devices). Alternative voice or audio I/O subsystems, such as a voice message recording subsystem, may also be implemented on the mobile electronic device 201. Although voice or audio signal output is typically accomplished primarily through the earpiece 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Reference is next made to FIG. 2, which shows an example of an exemplary earpiece 256 that is used in audio devices. The earpiece comprises a sound-emitting portion 280 and protruding spring-like contacts 290 and 292. The contacts 290 and 292 provide an electrical connection between the sound-emitting portion 280 and a source of an audio signal. The audio signal can be provided, for example, by the microprocessor 240 of a mobile device or alternatively by other components of the mobile device 201 capable of providing an audio signal, for example a dedicated audio processor (not shown).

The contacts 290 and 292 exert a spring force extending perpendicularly out of the plane formed by the sound emitting portion 280. This spring force serves two primary functions. The first is to ensure that electrical contact is maintained with the audio signal source that is to be rendered by the earpiece 256, such as for example, an audio signal output of a digital signal processor (DSP) component of the microprocessor 240. The second primary function of the spring force is to ensure that the earpiece 256 remains firmly in its designated position within the audio device.

The earpiece 256 is referred to throughout in describing embodiments of earpiece modules. However, it is to be understood that other configurations of earpieces can be accommodated by the earpiece module disclosed.

Figure 3:
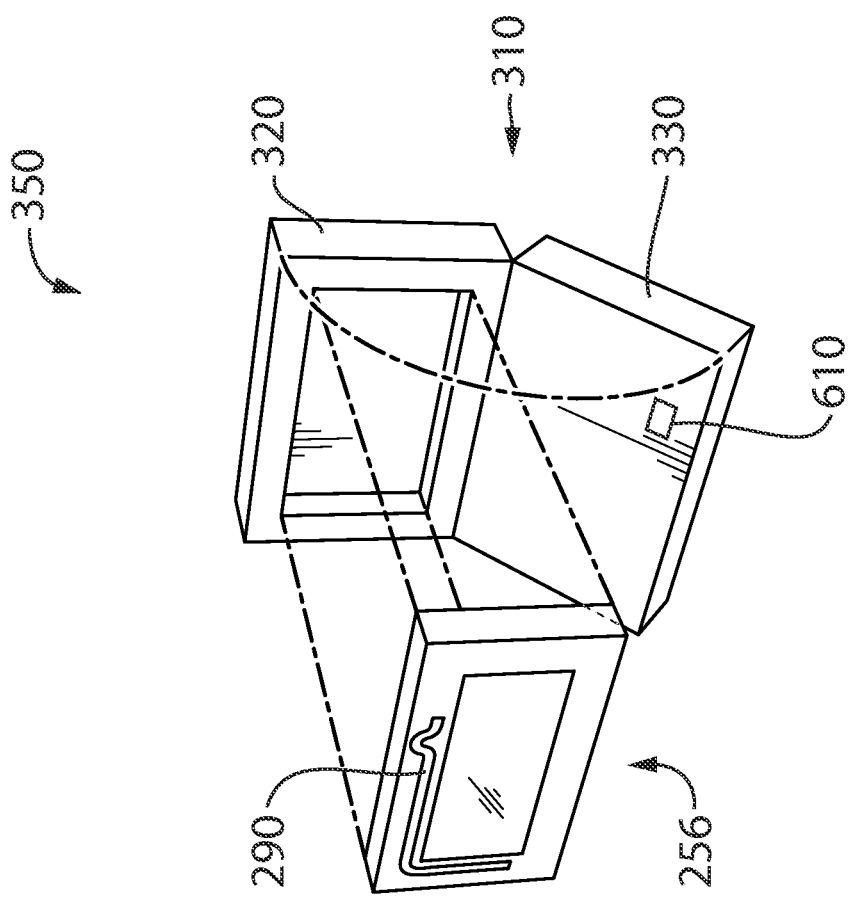
FIG. 3 shows a perspective view of a module for containing an earpiece.

Reference is next made to FIG. 3 which shows one possible embodiment of a module 350 for containing an earpiece 256 for an audio device, the earpiece 256 having at least one protruding electrical contact 290. The module comprises a first portion 320 and a second portion 330, the first portion 320 and the second portion 330 being opposable and forming a cavity sized to accommodate an earpiece 256. The module further comprises at least one electrical contact 610 within the cavity, on one of the first portion 320 and the second portion 330. The electrical contact 610 is positioned to engage a protruding electrical contact 290 of an earpiece 256 positioned within the cavity.

Figure 4A:
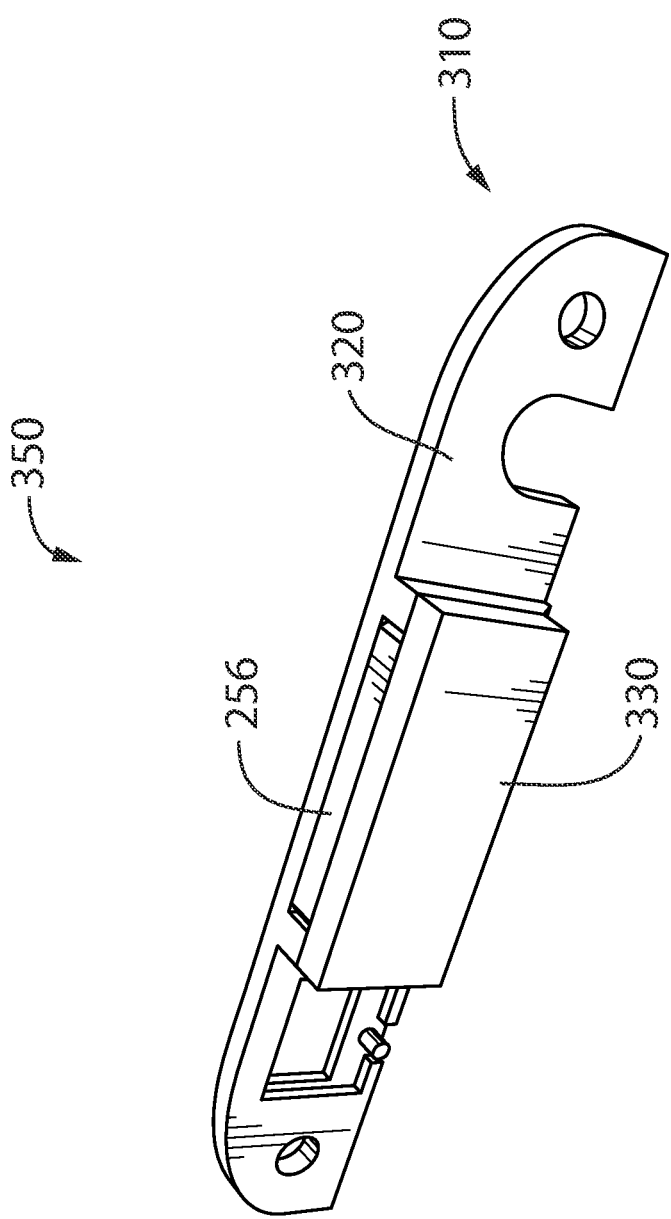
FIG. 4A shows a perspective view of an assembled earpiece module.

Reference is next made to FIG. 4A, which shows an example embodiment of an earpiece module 350, assembled. The earpiece module comprises a housing 310, which has a first portion 320 and a second portion 330. The housing 310 and its portions 320, 330 may be made of any material suitable for bearing the spring force exerted by the contacts 290, 292 of an earpiece for an audio device 256. In an embodiment described herein, the housing 310 and its portions 320, 330 are made of a plastic material, such as polycarbonate or acrylonitrile butadiene styrene (commonly known as "ABS"). However, other materials, for example metals such as stainless steel or magnesium, may be used.

In this embodiment, the first portion 320 has a first surface 440, and the second portion 330 has a second surface 450. The first surface is configured to contact a protruding electrical contact of the earpiece when positioned in the cavity. The first portion 320 and the second portion 330 can be movable into an opposing engagement in a variety of different ways, which will be discussed in further detail below. Once the first portion 320 and the second portion 330 have been moved into such an opposing engagement, the opposable surfaces 440, 450 are facing one another in a manner that contains any force exerted by the protruding electrical contact of the earpiece within the module. This helps prevent the earpiece from being pushed against a housing of an audio device in which the module is installed.

In this embodiment, at least one of the portions 320, 330 will have a recess 460 formed therein. The at least one recess, if included, is located on one or both of the first portion 320 and the second portion 330 such that, when the first portion 320 and the second portion 330 are moved into opposing engagement, a cavity is formed (not shown in this figure) that is sized to accommodate an earpiece 256 for an audio device. A variety of different recess configurations will achieve this goal. In an example embodiment described in further detail below, one portion has a recess formed therein that, by itself, is sized to accommodate the earpiece 256. Many other configurations are also possible, for example, one in which a recess is formed in each of the first portion 320 and the second portion 330, where each such recess is one half the size of the earpiece 256.

When one example embodiment of the earpiece module 350 is fully assembled, the earpiece 256 is essentially contained within or "sandwiched" between the first portion 320 and the second portion 330 of the housing 310, as shown in FIG. 4A. The earpiece 256 is positioned in the cavity formed between first portion 320 and the second portion 330. The earpiece 256 need not be completely enclosed by the first portion 320 and the second portion 330. This can be seen from FIG. 4A in that an upper surface of the earpiece 256 is visible. However, the contacts 290, 292 should be engaged by either the first portion 320 or the second portion 330, or both (not shown in FIG. 4A).

When the earpiece 256 is "sandwiched" between the first portion 320 and the second portion 330 as shown in FIG. 4A, and the contacts 290, 292 of the earpiece 256 are engaged by the first portion 320 and the second portion 330, the spring force exerted by the contacts 290, 292 is borne by the first portion 320 and the second portion 330, and is contained within the earpiece module 350. When the fully assembled earpiece module 350 is placed within an audio device, for example, the spring force exerted by the contacts 290, 292 on any structure external to the earpiece module 350, including the housing of the audio device, is minimized.

Figure 4C:
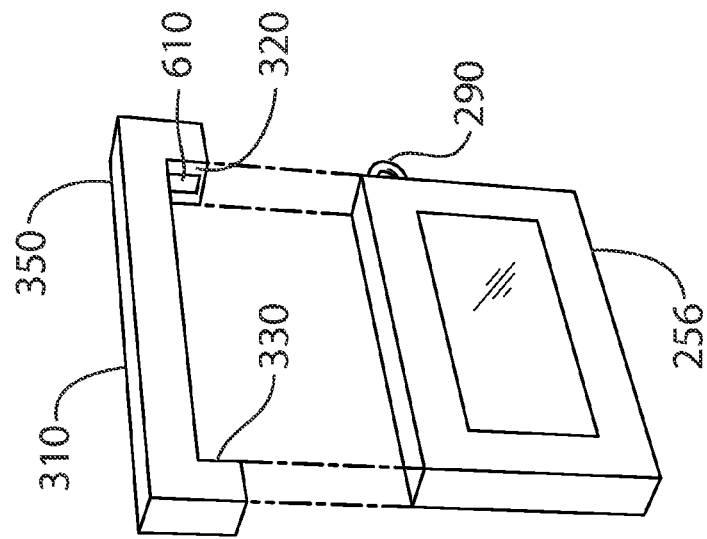
FIGS. 4B and 4C show perspective views of alternative embodiments of earpiece modules.
Figure 4B:
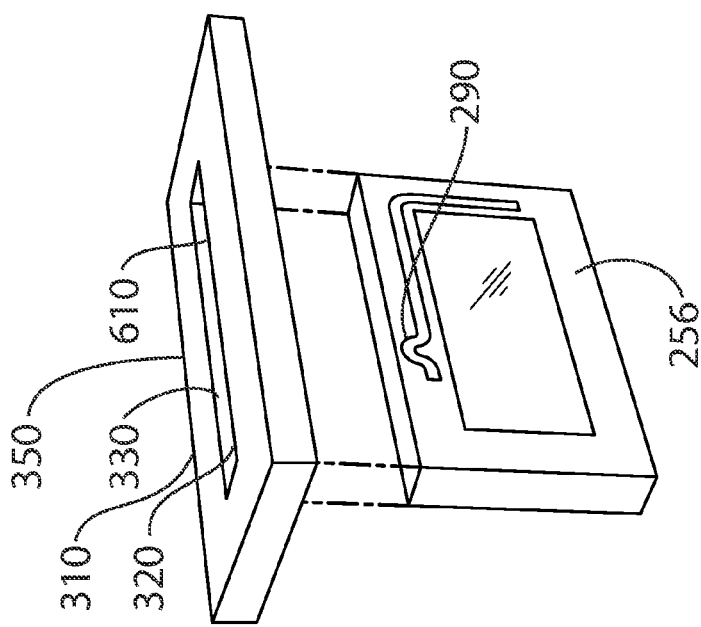

Additional embodiments of the earpiece module 350 are possible. For example, FIG. 4B depicts a module 350 that can slide over the top portion of an earpiece 256 and engage the contact 290 of the earpiece 256. As another example, FIG. 4C depicts a module 350 that slides over the top portion of an earpiece 256 and engages the contact 290 located on the side of the earpiece 256 (i.e., not on the same surface on which the sound emitting portion 280 is located). In both of the embodiments referenced above, the first portion 320 and the second portion 330 are in an opposing arrangement, but need not be engaged in the sense that they are in physical contact, as shown in FIG. 4A. The spring force exerted by the contact 290 is borne by the first portion 320 and the equal, opposite force is borne by the second portion 330. Both forces are contained within the earpiece module 350.

Optionally, in any of the embodiments described herein, either the first portion 320 or the second portion 330 can have an audio aperture 470 formed therein. The audio aperture 470 can allow for improved audio volume and quality when the sound emitting portion 280 of the earpiece 256 is placed adjacent to the audio aperture 470 when the earpiece module 350 is fully assembled.

Figure 5:
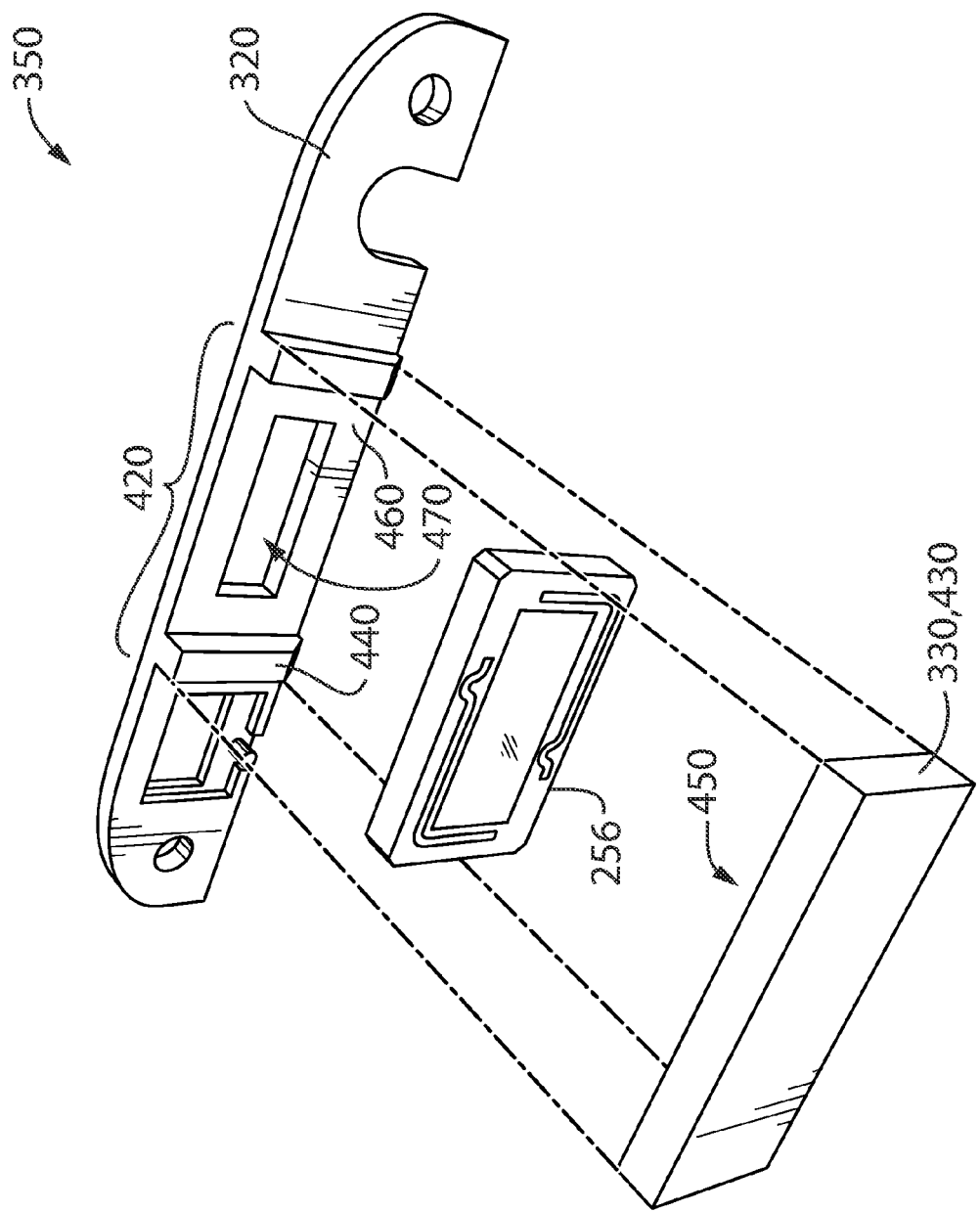
FIG. 5 shows a rear exploded view of an earpiece module.

Reference is next made to FIG. 5, which shows another example embodiment of the earpiece module 350 of the present disclosure. In this example embodiment, the first portion 320 and the second portion 330 of the housing 310 comprise a pair of brackets 420, 430. The brackets 420, 430 can be made of any material that is suitable for the housing 310 and its portions 320, 330. The first of the pair of brackets 420 has a first surface 440, and the second of the pair of brackets 430 has a second surface 450. In the example embodiment illustrated in FIG. 5, the first surface 440 has a recess 460 formed therein. This recess 460 is sized to accommodate the earpiece for an audio device 256. As discussed above, the recess 460 can appear in many configurations, in conjunction with an additional recess on the second surface 450 (other opposing recess not shown), so long as the cavity formed between the first and second brackets 420, 430 when these brackets are moved into opposing engagement is appropriately sized to accommodate an earpiece 256. The earpiece 256 can be any suitable earpiece for the audio device.

The embodiment illustrated in FIG. 5 demonstrates one possible means by which the first portion 320 and the second portion 330 may be moved into opposing engagement. In this embodiment, the first portion 320 and the second portion 330 comprise two separate brackets, 420, 430 that can be placed together in opposing engagement. Other means by which the first portion 320 and the second portion 330 may be brought into opposing engagement are possible, such as a "clam shell" structure (shown in FIG. 3A) by which the first portion 320 and the second portion 330 are hinged together at one end, and can pivot around the hinge. As well, it is possible that the first portion 320 and the second portion 330 can be made of a "heat shrink" material such that, when heat is applied to the first portion 320 and the second portion 330, the portions shrink and the first surface 440 and the second surface 450 meet in opposing engagement.

Figure 6:
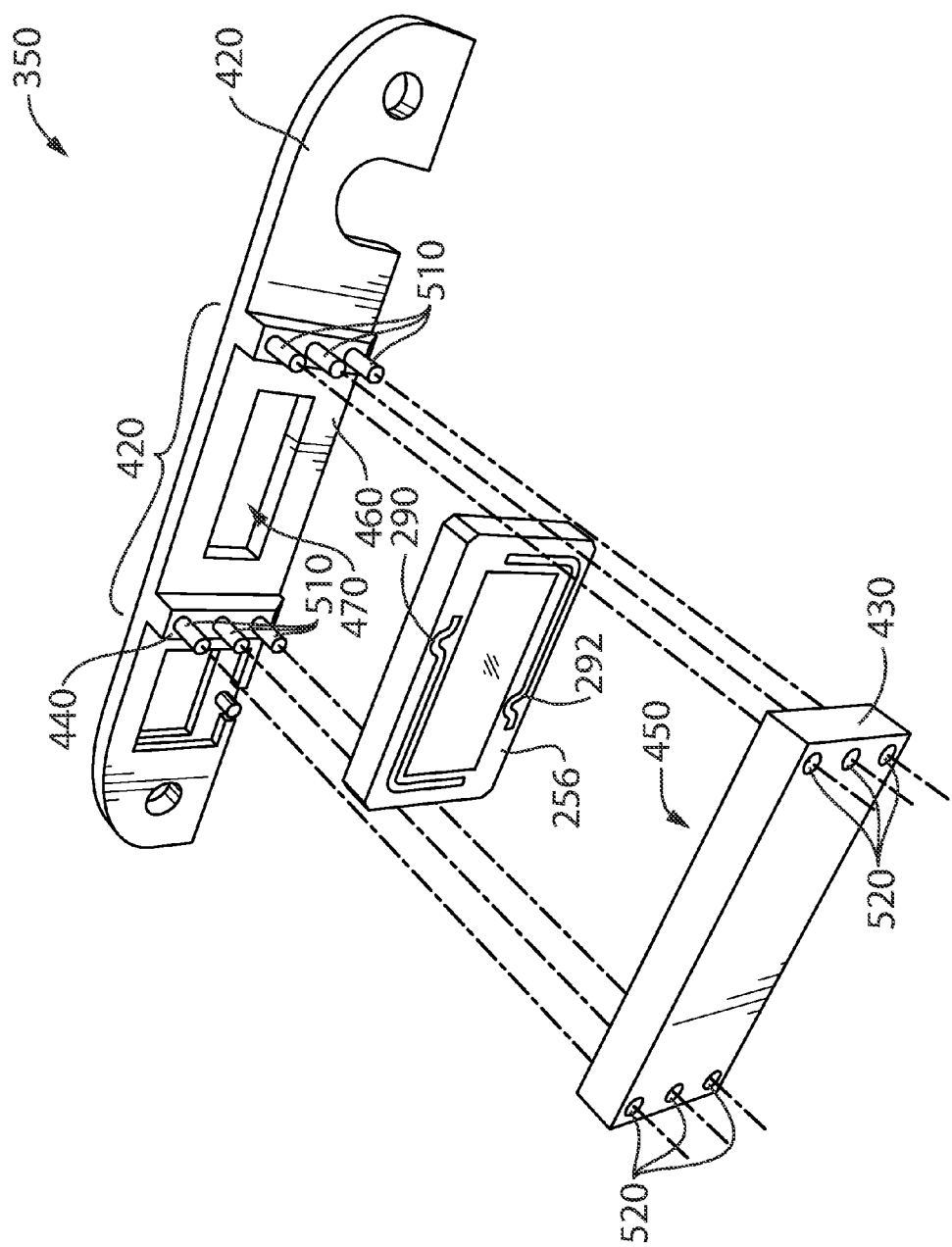
FIG. 6 shows a rear exploded view of another example of an earpiece module.

Reference is next made to FIG. 6, which shows another example embodiment of the earpiece module 350 of the present disclosure. The first surface 440 and the second surface 450 of the first portion 320 and the second portion 330 (illustrated in FIG. 6 as a pair of brackets 420, 430) can be engaged in any suitable manner to contain the force exerted by the contacts 290, 292 of the earpiece 256 within the module 350. In the example embodiment illustrated in FIG. 6, "heat stakes" are used to achieve this engagement. "Heat stakes" are a well known means of attaching plastic components to one another. "Heat stakes" are plastic pegs that protrude from one plastic component and are sized to be inserted into corresponding plastic apertures protruding from another plastic component. Both the plastic pegs and the plastic apertures are then designed to receive heat, melt (at least partially) and then re-solidify as one piece after the heat source is removed.

In the example embodiment shown in FIG. 6, heat stakes 510 protrude from the first bracket 420. As well, plastic apertures 520 are provided on the second bracket 430. The apertures 520 are positioned and sized to receive the heat stakes 510 when the first surface 440 and the second surface 450 of the pair of brackets 420, 430 are moved into opposing engagement. Once the heat stakes 510 have been received by the apertures 520, heat can be applied to at least partially melt both the heat stakes 510 and the apertures 520. Once the heat source has been removed, the melted plastic will re-solidify, forming a seal that will hold the pair of brackets 420, 430 together.

Figure 7:
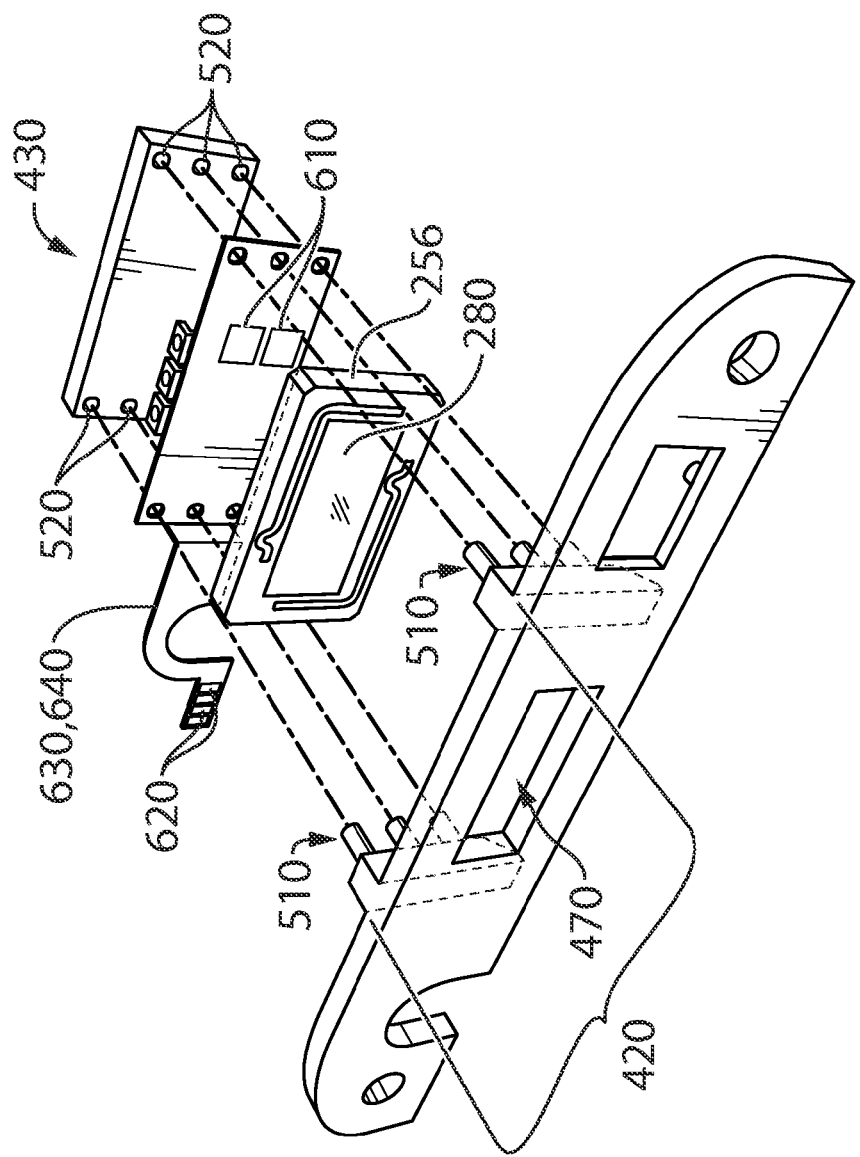
FIG. 7 shows a front exploded view of another example of an earpiece module.

Reference is next made to FIG. 7, which shows another example embodiment of the earpiece module 350 of the present disclosure. In this embodiment, at least one interior contact 610 is provided within the cavity formed between the pair of brackets 420, 430 when the brackets are brought into opposing engagement. The contact 610 can be of any size and shape, and be made of any material suitable for engaging at least one of contacts 290, 292 of an earpiece, and creating an electrical connection therebetween. One contact 610 should be provided for every contact the earpiece happens to have.

As well, at least one exterior contact 620 is provided outside the cavity formed between the pair of brackets 420, 430 when these brackets are brought into opposing engagement. This exterior contact 620 can be of the same size and shape, and made of the same material as the at least one interior contact 610. One exterior contact 620 should be provided for each interior contact 610 that is provided.

Furthermore, a circuit 630 is provided to establish an electrical connection between the at least one interior contact 610 and the corresponding at least one exterior contact 620. The circuit 620 should comprise distinct conductive pathways to electrically connect each "pair" of interior and exterior contacts 610, 620.

In an embodiment illustrated in FIG. 7, a flexible printed circuit board 640 (the "flex PCB") is provided. The flex PCB 640 physically supports the interior contacts 610, the exterior contacts 620 and the circuit 630. As shown in FIG. 7, the flex PCB 640 can be "sandwiched" between the pair of brackets 420, 430 along with the earpiece 256. In this configuration, the interior contacts 610 can electrically engage the contacts 290, 292 of the earpiece 256. As well, the flex PCB 640 can extend in between engaged heat stakes 510 and apertures 520, carrying the circuit 630 outside of the cavity formed between the pair of brackets 420, 430 and onward to the exterior contacts 620. This configuration allows for an audio signal to be provided to the earpiece 256 while it is enclosed within the earpiece module 350.

Many other configurations that allow for an audio signal to be provided to the earpiece 256, while enclosed within the earpiece module 350 are possible. For example, a simple insulated wire can be provided. Stripped ends of the insulated wire can comprise the interior and exterior contacts 610, 620 respectively, with the remaining length of the wire comprising the circuit 630. The wire can be passed between the engaged heat stakes 510 and apertures 520, allowing for an audio signal to be provided to the earpiece 256 while it is enclosed within the earpiece module 350. As another example, an elongate metal contact can be inserted into the cavity such that one end of the contact extends between the engaged heat stakes 510 and apertures 520, allowing electrical contact to be made between the earpiece 256 and a source of an audio signal external to the cavity, via the elongate contact.

In the embodiment illustrated in FIG. 7 or any other embodiment with which an audio signal from outside the earpiece module 350 can be provided to an earpiece 256 enclosed within the earpiece module 350, pre-assembled earpiece modules 350 can be quickly and easily incorporated into audio devices, such as mobile devices, by connecting the exterior contacts 620 to the source of the device's audio signal, and positioning the pre-assembled module 350 in the audio device's housing. Assembling audio devices in this manner may decrease the time and labour required to assemble such devices, which may result in lowered costs of production.

Figure 8:
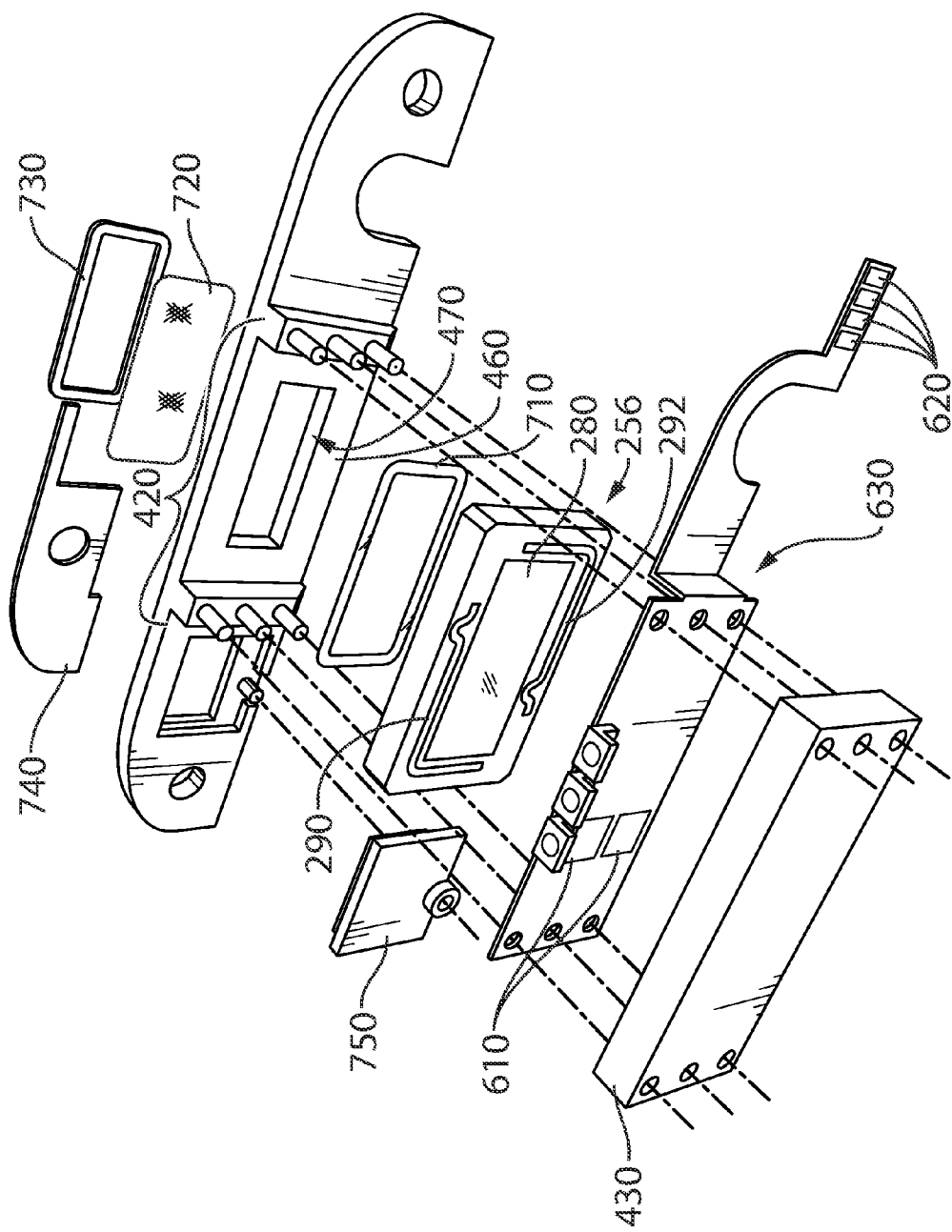
FIG. 8 shows a rear exploded view of a further example of an earpiece module.

Reference is next made to FIG. 8, which shows another example embodiment of the earpiece module 350 of the present disclosure. Several additional components can be added to the "sandwich" that is the earpiece module 300 to improve the quality of the sound emitted by the earpiece 256 enclosed therein. For example, an earpiece adhesive 710 and earpiece gasket 730 can be used to provide a seal so that a direct audio path exists between the sound emitting portion 280 of the earpiece 256 and the audio aperture 470. Such an arrangement provides improved sound volume and quality. As well, an earpiece mesh 720 can be attached to the bracket 420 in which the audio aperture 470 is formed, using adhesive or any other suitable attachment means, on the side opposite the side on which the sound emitting portion 280 is adhered. The mesh 720 filters out background noise to provide clearer audio to the user of the audio device.

Numerous other components that are either necessary or desirable in an audio device can also be physically supported by the earpiece module 350. For example, in some mobile devices, an antenna 740 for communication with the Global Positioning System ("GPS") is included. Other embodiments include indicator lights to aid the user. Such indicator lights are often generated by a light source internal to the mobile device, and are displayed to the user via a component known as a light guide 750 that transmits light from the internal source to the external surface of the device through internal reflection. Both of these components, as well as others that may be needed or desired in an audio device, can be physically supported by the earpiece module 350, as shown in FIG. 8.

It should be noted that embodiments of the earpiece module 350 described above can be equally useful with the earpiece 256 included. That is, a pre-assembled earpiece module with an earpiece 256 included can be provided. Such a module can be utilized using essentially the teachings described above, modified as necessary to include the earpiece 256.

Figure 9B:
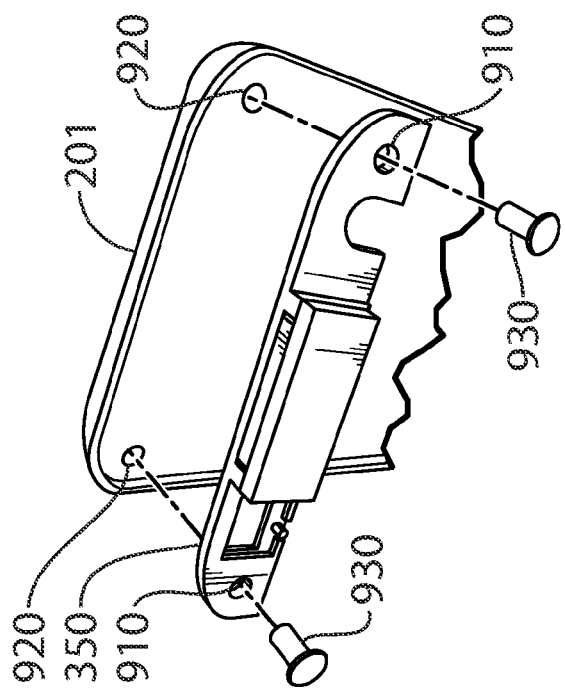
FIG. 9B shows an exploded view of an earpiece module as installed in an audio device.
Figure 9A:
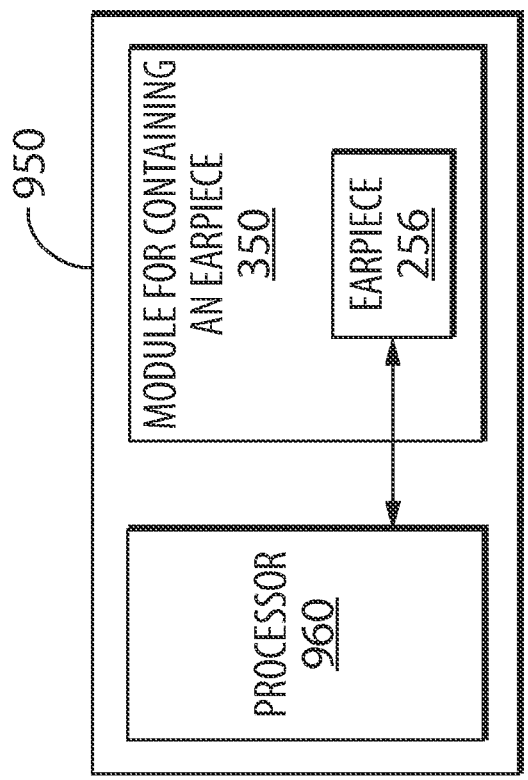
FIG. 9A shows a block diagram of an example of an audio device in which an earpiece module could be installed.

The earpiece module 350 can be installed in an audio device, such as a mobile electronic device 201, as shown in FIGS. 9A and 9B. FIG. 9A shows an example of an audio device into which an earpiece module 350 can be installed. The audio device comprises a housing 950 and an audio signal processing apparatus 960 mounted within the housing. The audio signal processing apparatus 960 can be any device capable of processing audio data and producing an audio signal for playback with an earpiece. The processor 240 of a mobile device is an example of a device that can serve as an audio signal processing apparatus 960. Other devices, such as dedicated audio processors, can also be used. The audio device of FIG. 9A further comprises a module 350 for containing an earpiece as described in any of the embodiments described above. The module 350 is mounted within the housing 950. The audio device of FIG. 9A further comprises an earpiece 256 provided in the cavity of the module 350, the earpiece having at least one protruding electrical contact that engages the at least one electrical contact within the cavity. The earpiece is in electrical communication with the processing apparatus to receive and audio signal from the processing apparatus.

FIG. 9B shows the reverse side of a mobile electronic device 201 with a portion of the device's back panel cut away. FIG. 9B also shows an embodiment of an earpiece module 350 comprising mounting apparatus for mounting the earpiece module 350 in the mobile electronic device 201. In the embodiment depicted in FIG. 9B, the mounting apparatus comprises a pair of holes 910 for receiving mounting screws 930. The earpiece module can be mounted in a mobile electronic device 201 by inserting mounting screws 930 through the holes 910 and into threaded sockets 920 provided in the interior of the housing of the mobile electronic device 201. The threaded sockets 920 can be dimensioned to securely receive mounting screws 930 and hold the earpiece module 350 in place within the mobile electronic device 201.

The earpiece module 350 can be mounted in an audio device such as a mobile electronic device 201 using other embodiments of a mounting apparatus. For example, the mounting apparatus provided on the earpiece module 350 can comprise heat stakes designed to be received by apertures provided within the housing of the mobile device 201. By inserting the heat stakes in the apertures and applying heat, the earpiece module 350 can be bonded to the mobile electronic device 201 in a manner similar to that of the brackets 420, 430 being engaged by heat stakes 510 and apertures 520. As well, a heat stake can be provided in the housing of the mobile electronic device 201 and an aperture for receiving a heat stake can be provided on the earpiece module 350, and the earpiece module 350 can be mounted within the mobile electronic device 201 in essentially the same manner as described above.

Figure 10:
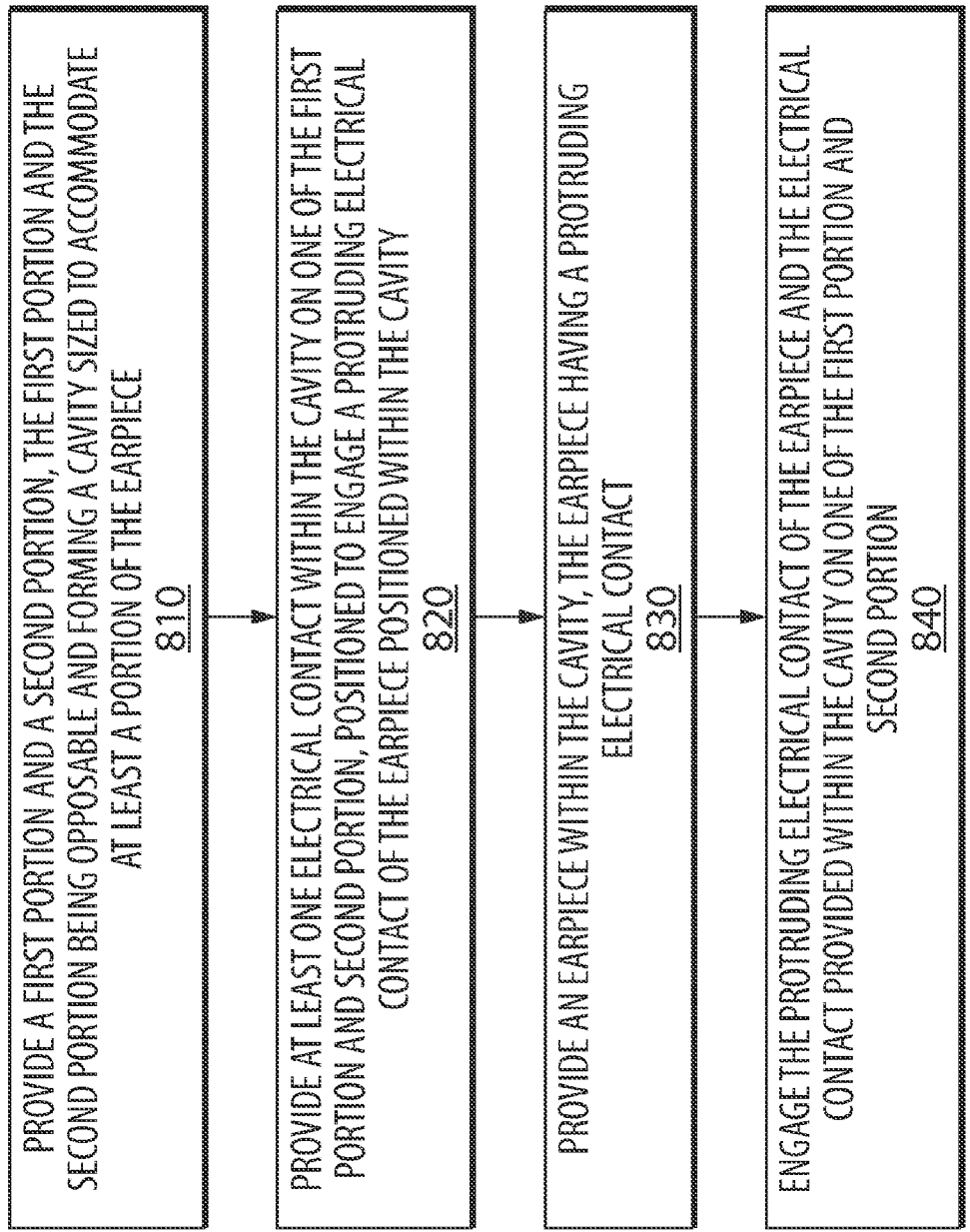
FIG. 10 shows in flowchart form an embodiment of a method for manufacturing an earpiece module for an audio device.

Reference is now made to FIG. 10, which shows a flow chart for a method for manufacturing an earpiece module for an audio device. The method comprises providing 810 a first portion 320 and a second portion 330, the first portion 320 and the second portion 330 being opposable and forming a cavity sized to accommodate at least a portion of an earpiece 256.

The method further comprises providing 820 at least one electrical contact 610 within the cavity on one of the first portion 320 and second portion 330. The electrical contact 610 can be positioned to engage a protruding electrical contact 290 of the earpiece 256 positioned within the cavity.

The method further comprises providing 830 an earpiece 256 within the cavity formed between the opposable first portion 320 and second portion 330. The earpiece 256 can be any earpiece for an audio device, as described above. The earpiece 256 will have at least one protruding contact, and by way of a non-limiting example, will have two protruding contacts 290, 292. The earpiece 256 will also have a sound emitting portion 280.

The method further comprises engaging 840 the protruding electrical contact 290 of the earpiece 256 and the electrical contact 610 provided within the cavity on one of the first portion 320 and second portion 330. In the case that there are two protruding electrical contacts 290, 292, two electrical contacts 610 should be provided within the cavity, and the protruding contacts 290, 292 should each engage one of the electrical contacts 610 provided within the cavity. Optionally, an audio aperture 470 can be provided in either the first or second portion 320, 330. If such an audio aperture 470 is provided, the earpiece 256 can be positioned in the cavity such that the sound emitting portion 280 is adjacent to the audio aperture 470 once the earpiece 256 is at least partially enclosed in the cavity formed between the first portion 320 and the second portion 330.

Optionally, the first portion 320 and the second portion 330 can be engaged by bringing the portions 320, 330 into opposing engagement by any means previously described. Optionally, the first portion 320 and the second portion 330 can be made of a plastic material capable of being melted and re-solidifying, such as polycarbonate or acrylonitrile butadiene styrene (commonly known as "ABS"). In this case, the first portion 320 and the second portion 330 can be engaged by moving the portions into opposing engagement, melting at least a portion of the first portion 320 and the second portion 330, pressing the portions 320, 330 together and allowing the melted plastic to re-solidify, forming a seal. The first portion 320 and the second portion 330 can also be made of other materials, for example metals such as stainless steel or magnesium.

As another alternative, the first portion 320 and the second portion 330 can be provided with plastic heat stakes 510 and corresponding plastic apertures 520, for use in engaging the first portion 320 and the second portion 330. Both the heat stakes 510 and apertures 520 can be any such structure in accordance with the teaching provided above. In this case, the first portion 320 and the second portion 330 can be engaged by moving the first portion 320 and the second portion 330 into opposing engagement, inserting the heat stakes 510 into the corresponding plastic apertures 520, melting a portion of the plastic material of the heat stakes 510 and apertures 520 and allowing the melted plastic to re-solidify, forming a seal between the heat stakes 510 and their corresponding apertures 520.

It will be apparent to those having ordinary skill in the art that certain adaptations and modifications of the described embodiments can be made, consistent with and without departing from the present disclosure. Unless otherwise indicated, the embodiments described in the disclosure shall be understood to be non-exclusive of each other such that any embodiment can include different features of other embodiments. Therefore, the above discussed embodiments are considered to be illustrative and not restrictive. Other embodiments consistent with the present disclosure will become apparent from consideration of the specification and the practice of the present disclosure taught and suggested herein. Accordingly, the specification and the embodiments disclosed therein are to be considered exemplary only, with the true scope and spirit of the present disclosure being identified in the following claims.

What is claimed is:

1. A module for containing an earpiece for an audio device, the earpiece having at least one protruding electrical contact exerting a spring force, the module comprising:
   a first portion and a second portion, the first portion and the second portion being opposable and forming a cavity sized to accommodate at least a portion of the earpiece; and
   at least one electrical contact within the cavity on one of the first portion and second portion, positioned to engage the protruding electrical contact of the earpiece positioned within the cavity, wherein the spring force exerted by the protruding electrical contact is borne by the module and is contained within the cavity formed by the module.

2. The module of claim 1, wherein the first portion and the second portion are opposably engageable.

3. The module of claim 1, wherein the first portion and the second portion comprise a plastic material capable of being melted and re-solidifying to couple the first and second portions together.

4. The module of claim 1, wherein one of the first portion and the second portion comprises at least one plastic heat stake and the other of the first portion and the second portion comprises at least one plastic aperture sized to receive the at least one heat stake.

5. The module of claim 1, further comprising:
   at least one other electrical contact outside the cavity; and
   a circuit establishing an electrical connection between the at least one electrical contact within the cavity and the at least one other electrical contact outside the cavity.

6. The module of claim 5, wherein the circuit comprises a flexible printed circuit board.

7. The module of claim 1, further comprising at least one mounting apparatus for mounting the module within an audio device.

8. The module of claim 7, wherein the mounting apparatus comprises at least one hole for receiving a mounting screw.

9. The module of claim 7, wherein the mounting apparatus comprises at least one heat stake.

10. The module of claim 7, wherein the mounting apparatus comprises at least one aperture sized to receive a heat stake provided within an audio device.

11. The module of claim 1, further comprising an audio aperture formed in one of the first portion and the second portion for facilitating the transmission of sound from the earpiece to the exterior of the cavity.

12. The module of claim 11, further comprising a mesh extending over the audio aperture.

13. The module of claim 1, further comprising a GPS antenna mounted to one of the first portion and the second portion.

14. The module of claim 1, further comprising an indicator light guide mounted to one of the first portion and the second portion.

* * * * *